United States Patent [19]
Lambrecht

[11] 3,823,485
[45] July 16, 1974

[54] PLAY DETECTOR FOR DETECTING PLAY AND INSPECTING THE FASTENING OF PARTS OF STATIONARY MOTORCARS AND TRAILERS

[75] Inventor: Willy Lambrecht, Destelbergen, Belgium

[73] Assignee: Appareillage Technique et Industriel S.A., Brussels, Belgium

[22] Filed: Apr. 21, 1972

[21] Appl. No.: 246,263

[30] Foreign Application Priority Data
Sept. 16, 1971  Belgium ............................. 108239

[52] U.S. Cl. ........................... 33/203.14, 73/117
[51] Int. Cl. .................................... G01b 19/28
[58] Field of Search ............ 33/203, 203.12, 203.13, 33/203.14; 73/117, 95

[56] References Cited
UNITED STATES PATENTS
1,717,131  6/1929  Weaver ........................... 33/203.14
3,683,683  8/1972  Demidov et al. ..................... 73/117

*Primary Examiner*—William D. Martin, Jr.
*Attorney, Agent, or Firm*—Eric H. Waters

[57] ABSTRACT

Checking apparatus is provided to check play and looseners of vehicle parts. Spaced plates are employed to support the wheels of a vehicle which otherwise is supported by a jack. Valves control the operation of piston-cylinder combinations to move the plates transversely and longitudinally of the vehicle.

8 Claims, 2 Drawing Figures

PATENTED JUL 16 1974　3,823,485

3,823,485

PLAY DETECTOR FOR DETECTING PLAY AND INSPECTING THE FASTENING OF PARTS OF STATIONARY MOTORCARS AND TRAILERS

FIELD OF THE INVENTION

The present invention relates to a play detector, and more particularly to an automatic tool for detecting play due to wear and for inspecting the fastening of parts of motorcars and trailers, which parts are of vital importance for safety.

BACKGROUND

In the traditional method of inspection two technicians are necessary. The maximum human physical effort that can be exerted on a wheel is relatively small in comparison to the optimum force which would have to be developed to inspect efficiently lorries and passenger cars having independent wheel suspension.

Moreover, an assisting technician has to get up and sit down again and again, which is a drawback.

SUMMARY OF INVENTION

The present invention has an object of the removing of these drawbacks and is characterized in that two sliding plates, arranged on either side of an inspection pit, are used preferably together with a modile car jack to partially lift the vehicles so that, as a result of the dynamic action of pushing and pulling forces exerted by the supporting areas of the wheels, a positive or a negative moment of force is applied on each wheel in the transverse or in the longitudinal direction of the vehicle. The moments thus exerted, which periodically load the relevant parts of the vehicle, make a technical inspection possible.

The invention is based on:

1. Practice which has shown the best way to test wheels in order to be able to determine the maximum play of the wheels and the parts mounting the wheels in general.
2. An understanding of the forces acting where the tire surface of a travelling vehicle is in contact with the surface of a road, namely, on the one hand, the transverse force occurring when a turn is taken and, on the other hand, the longitudinal force occurring during braking and accelerating.

Furthermore it is generally known that it is important to know whether a pivoted part is in good condition and to inspect the fastening of a part, which is suspended loosely with respect to a part that is secured to the chassis or to a front or rear axle.

BRIEF DESCRIPTION OF DRAWING

In order that the invention may be better understood one embodiment will be described with reference to the accompanying drawing in which.

DETAILED DESCRIPTION

Figure 1:
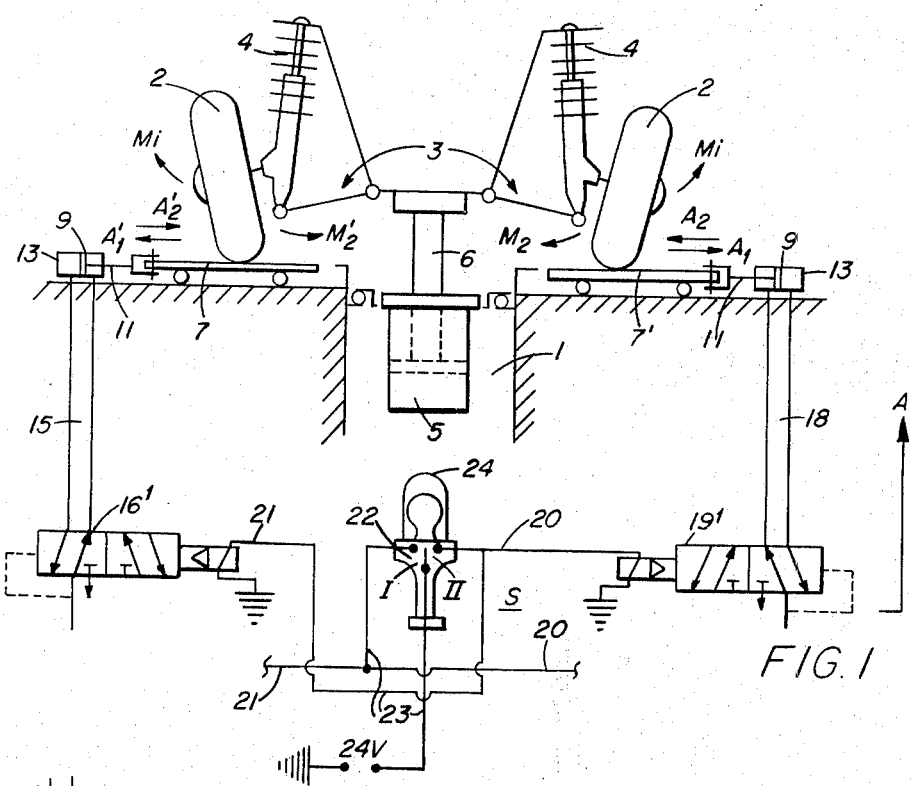
FIG. 1 is a fragmentary view in front elevation of apparatus provided in accordance with the invention.
Figure 2:
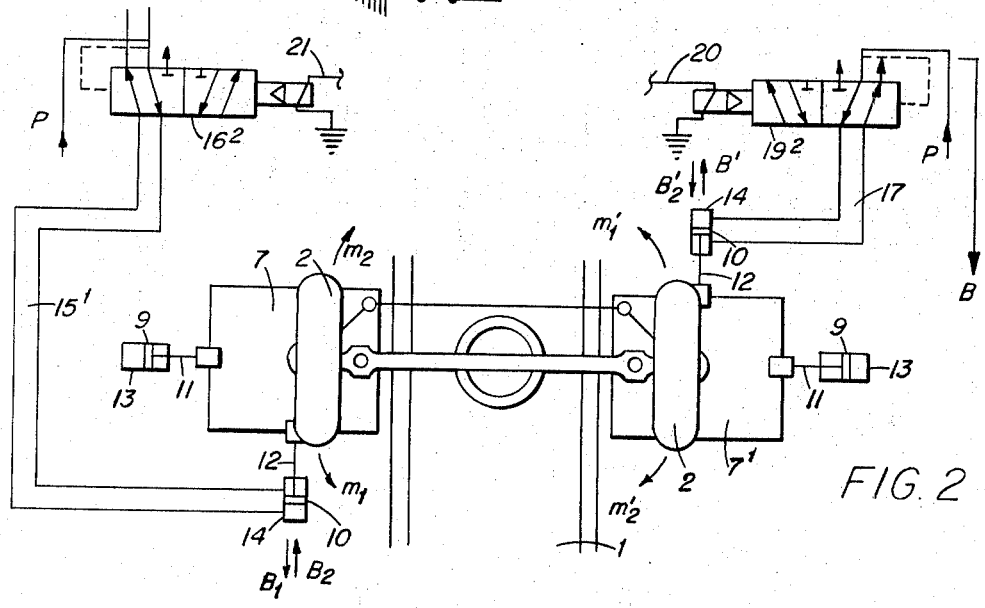
FIG. 2 is a fragmentary plan view of said apparatus.

The drawing shows an inspection pit 1, the wheels 2 of the vehicle, the support arms 3 of the wheel suspension, the springs 4 and a mobile car jack 5 with a piston 6.

In accordance with the invention two sliding plates 7, $7^1$ are arranged on either side of the inspection pit. The plates 7, $7^1$ are so arranged that they can be moved in a transverse direction and in a longitudinal direction over a distance of 50 mm. These sliding movements are controlled by pistons 9, 10, which are provided with rods 11, 12, and which can be moved in cylinders 13, 14 by compressed air under a pressure of about 7 kg per sq.cm.

The cylinders of plate 7 on one side of pit 1 are connected via pipes 15, $15^1$ to electro-pneumatic control valves $16^1$, $16^2$, while the cylinders of plate $7^1$ on the other side of the pit are connected to electro-pneumatic control valves $19^1$, $19^2$ by pipes 17, 18.

The valves $16^1$ and $19^1$ are designed to operate the plates in the transverse direction and the valves $16^2$ and $19^2$ in the longitudinal direction. They are serviced electrically by a source S capable of supplying 24 V, for example.

The cylinders 13 for operation in the transverse direction, situated on opposite sides of the inspection pit, are pneumatically connected to the two electro-pneumatic valves $16^1$, $19^1$ and the cylinders 14 for operation in the longitudinal direction are pneumatically interconnected with the other electro-pneumatic valves $16^2$, $19^2$. The valves $16^1$, $16^2$ and $19^1$, $19^2$ can be four-way valves.

On the other hand, the electro-pneumatic control valves 16 and 19 are electrically connected by conductors 20, 21 to a switch 22 which is connected to wires 20, 21 by means of flexible conductors 23. Switch 22 is preferably provided with an inspection lamp 24.

The vehicle to be inspected is rolled onto the apparatus, one axle at a time. The technician has the axle lifted, so that the remaining contact between the tire and the sliding plate of the apparatus, is only slight.

By using the apparatus together with a mobile car jack, it is possible in the supporting areas of the wheels to use a force, whose 1. point of application is defined by the contact between the surface of the tire and the sliding plate of the apparatus;
2. magnitude can be selectively regulated by lifting the vehicle to a greater or lesser extent, thereby pressing the tires accordingly against the sliding plates;
3. direction and sense is defined in the transverse or the longitudinal direction of the vehicle.

To inspect the vehicle in the transverse direction, the operator presses the switch 22, incorporated in the portable lamp, so that it is set in position II. The two plates 7, $7^1$ move under the tires away from the body of the vehicle under the influence of pulling forces $A_1$ and $A_{1'}$, and the wheels move according to their play. The respective moments are then $M_1$ and $M_{1'}$.

The operator then disconnects the position II of the switch 22. The plates 7, $7^1$ move back in the opposite direction, that is towards the body of the vehicle, under the action of pushing forces $A_2$ and $A_{2'}$, controlled by springs incorporated in the pneumatic valves $16^1$ and $19^1$, and the moments change to $M_2$ and $M_{2'}$, respectively.

To inspect the vehicle in the longitudinal direction, the operator presses the switch 22 again, but this time it is set in position I. The two plates 7, $7^1$ move in the longitudinal direction of the vehicle according to $B_1$ and $B_2$, at right angles to the first direction and the respective moments are now $m_1$ and $m_{1'}$.

The operator then breaks the electrical contact of position I. The two plates 7, 7¹ move back, that is in the opposite sense according to forces $B_2$ and $B_2$, and the sense of the moments is also reversed to $m_2$ and $m_2$, respectively.

Owing to the moments thus exerted, which periodically load the relevant parts of the vehicle, it is possible to carry out a technical inspection with a minimum of labor, and a maximum improvement in quality.

The principle of the invention is such that as a result of the dynamic action of pulling and pushing forces exerted by the supporting surfaces of the wheels, a corresponding positive or negative moment of forces is applied on each wheel in the transverse or in the longitudinal direction of the vehicle.

Summarizing, the advantages of the apparatus are as follows:

only one technician is required;

all traditional manual operations are replaced in a rational fashion. The tester is thereby helped by a device he operates himself and which can exert a considerably larger force.

The various tests may concern wheel fastening;

play in wheel bearings;

play in steering swivels;

play in, and fastening of, points of articulation of wheel suspension parts (ball and socket joints, rubber cushions, silent blocks, suspension triangles);

the conditions of the Mac Pherson spring suspension;

fastening of the springs on the axle;

breakage of axles, as well as the fastening of axles;

the conditions of a frameless or half frameless chassis;

fastening and the condition of forward and rear axles;

play in and the fastening of steering means (ball and socket joints, couple arms, steering box);

fastening of brake drums;

fastening of brake anchoring plates;

failure of wheel brake.

I claim:

1. Apparatus for detecting play between parts of a vehicle having transverse and longitudinal extents and for inspecting the connection of said parts, said apparatus comprising movable members adapted to support the wheels of the vehicle, first means to displace said members in the transverse direction of said vehicle, and second means to displace said members in the longitudinal direction of said vehicle, said first means displacing said members in opposite directions, said apparatus further comprising a jack juxtaposed to and located between said members to raise the vehicle while maintaining said wheels on said movable members.

2. Apparatus as claimed in claim 1 wherein said members are flat plates presenting at least substantially coplanar support surfaces.

3. Apparatus as claimed in claim 1 wherein said first and second means displace said members in directions which are at least substantially perpendicularly disposed relative to each other.

4. Apparatus as claimed in claim 1 comprising means defining an inspection pit below said members.

5. Apparatus as claimed in claim 1 wherein said first and second means include piston and cylinder combinations coupled to said members to displace the same, and control means for said combinations.

6. Apparatus as claimed in claim 5 wherein the control means is an electrical control including a switch, a flexible conductor connected to the switch and an inspection lamp displaceable with said switch.

7. Apparatus as claimed in claim 6 wherein the electrical control includes at least one electro-pneumatic valve.

8. Apparatus as claimed in claim 7 wherein the valve is a four-way valve.

* * * * *